(12) United States Patent
Dymetman (10) Patent No.: US 8,543,374 B2
(45) Date of Patent: Sep. 24, 2013

(54) TRANSLATION SYSTEM COMBINING HIERARCHICAL AND PHRASE-BASED MODELS

(75) Inventor: Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 661 days.

(21) Appl. No.: 12/855,084

(22) Filed: Aug. 12, 2010

(65) Prior Publication Data

US 2012/0041753 A1 Feb. 16, 2012

(51) Int. Cl.
*G06F 17/27* (2006.01)
*G06F 17/28* (2006.01)

(52) U.S. Cl.
USPC .................................. 704/2; 704/9

(58) Field of Classification Search
USPC .......................................... 704/2, 9
See application file for complete search history.

(56) References Cited

U.S. PATENT DOCUMENTS

| | | | | |
|---|---|---|---|---|
| 5,594,641 A * | 1/1997 | Kaplan et al. | | 1/1 |
| 5,806,032 A * | 9/1998 | Sproat | | 704/255 |
| 7,010,476 B2 * | 3/2006 | Karttunen et al. | | 704/1 |
| 7,129,932 B1 * | 10/2006 | Klarlund et al. | | 345/168 |
| 7,149,688 B2 * | 12/2006 | Schalkwyk | | 704/255 |
| 7,783,470 B2 * | 8/2010 | Kahlon | | 703/22 |
| 7,974,833 B2 * | 7/2011 | Soricut et al. | | 704/9 |
| 7,983,913 B2 * | 7/2011 | Seltzer et al. | | 704/251 |
| 8,065,300 B2 * | 11/2011 | Gupta et al. | | 707/730 |
| 2007/0299668 A1 * | 12/2007 | Allauzen et al. | | 704/255 |

OTHER PUBLICATIONS

Bar-Hillel, et al. "On formal properties of simple phrase structure grammars", pp. 143-172.
Berstel, from III Rational Transductions, 111.8 Decision Problems, 1979, pp. 90-91.
Chiang, David. "An Introduction to Synchronous Grammars", Jun. 21, 2006, pp. 1-16.
Chiang, David. "Hierarchical Phrase-Based Translation", Association for Computational Linguistics, 2007, vol. 33, No. 2, pp. 201-228.
Koehn, et al. "Moses: Open Source Toolkit for Statistical Machine Translation", Association for Computational Linguistics, 2007, Proceedings of the ACL 2007 Demo and Poster Sessions, pp. 177-180.
Kumar, et al. "Local Phase Reordering Models for Statistical Machine Translation", Association for Computational Linguistics, 2005, Proceedings of Human Language Technology Conference and Conference on Empirical Methods in Natural Language Processing, pp. 161-168.
Lang, Bernard. "Recognition can be Harder than Parsing", INRIA—Rocquencourt, pp. 1-11.

(Continued)

*Primary Examiner* — Eric Yen
(74) *Attorney, Agent, or Firm* — Fay Sharpe LLP (57) ABSTRACT

A method comprises: receiving or generating bi-content including source content in a source language or format and corresponding target content in a target language or format, wherein the target language or format is different from the source language or format; generating a source weighted finite state automaton representing the source content of the bi-content; generating a target weighted finite state automaton representing the target content of the bi-content; and computing a bilateral intersection between (i) the source weighted finite state automaton, (ii) a synchronous weighted context-free grammar comprising synchronized grammars for the source language or format and the target language or format, and (iii) the target weighted finite state automaton to generate an enriched synchronous weighted context free grammar.

21 Claims, 5 Drawing Sheets

(56) References Cited

OTHER PUBLICATIONS

Lewis, et al. "Syntax-Directed Transduction", Journal of the Association for Computing Machinery, vol. 15, No. 3, Jul. 1968, pp. 465-488.

Mohri, Mehryar. "Weighted Automata Algorithms", Courant Institute of Mathematical Sciences, pp. 1-41.

Satta, et al. "Some Computational Complexity Results for Synchronous Context-Free Grammars", Association for Computational Linguistics, 2005, Proceedings of Human Language Technology Conference and Conference on Empirical Methods in Natural Language Processing, pp. 803-810.

Satta, Giorgio. "Translation Algorithms by Means of Language Intersection", Association for Computational Linguistics, 2009, pp. 1-56.

Smith, et al. "Weighted and Probabilistic Context-Free Grammars Are Equally Expressive", Association for Computational Linguistics, 2007, vol. 33, No. 4, pp. 477-491.

Zaslavskiy, et al. "Phrase-Based Statistical Machine Translation as a Traveling Salesman Problem", ACL and AFNLP, 2009, Proceedings of the 47th Annual Meeting of the ACL and the 4th IJCNLP of the AFNLP, Aug. 2-7, 2009, pp. 333-341.

"Semiring", Wikipedia, Retrieved from Internet; http://en.wikipedia.org/wiki/Semiring.

* cited by examiner

TRANSLATION SYSTEM COMBINING HIERARCHICAL AND PHRASE-BASED MODELS

BACKGROUND

The following relates to the translation arts, natural language translation arts, format conversion arts, and so forth.

In translation or conversion applications, information content in a source language or source format is converted to a target language or target format. For example, content in a source natural language such as French may be translated to a target natural language such as English. In another example, a document in a source format such as XML using one document type definition (DTD) may be converted to a target format such as XML using another DTD.

One general approach for natural language translation is the phrase-based approach, in which a database of bilingual source language-target language pairs is referenced. Portions of source language content to be translated are compared with the source language elements of bilingual pairs contained in the database to locate source language matches, and the translation is generated by combining the target language elements of matching bilingual pairs. Phrase-based translation approaches are useful in natural language translation because natural language content tends to deviate from the standard rules (i.e., "grammar") relatively frequently, and such deviations are readily handled by a suitably comprehensive bilingual phrase database.

However, phrase-based translation performance depends on the comprehensiveness of the bilingual pair database, and can also depend on text length of the bilingual pairs in the database. Matching short phases produces many matches, but the short text length of the matches generally reduces matching reliability. Also, grammatical rules may be violated in combining the short phrases to construct the translation. At the opposite extreme, in a "translation memory" approach the bilingual pairs have long text lengths (possibly extending over multiple sentences or even multiple paragraphs), and an exact (or even close) match is likely to be correct. However, the number of matches is greatly reduced compared with short phrases.

Another translation approach is the hierarchical grammar-based approach, in which a grammar including rewriting rules is used to parse the natural language content. The grammatical structures are hierarchically arranged—for example, a noun and a pronoun (and perhaps an adjective or so forth) are combined to form a noun phrase which in turn is combined with a verb phrase (similarly built up from parts of speech such as a verb and adverb) to form a sentence. The grammar used for translation applications is a synchronous grammar in which grammatical structures (e.g., grammatical phrases such as noun phrases and verb phrases) in the source and target languages are matched up or synchronized. The translation process then amounts to parsing the source language content and using the synchronized target language grammatical structures together with a bilingual dictionary or lexicon to construct the target language translation.

Hierarchical grammar-based approaches are applicable to varying lengths of text and generate translations that comply with grammatical rules of the target language. However, hierarchical grammar-based approaches can fail when the source language content deviates from the standard grammar, for example in the case of certain collocations or terminological expressions. These approaches may also fail to capture target language translations that employ such grammar deviations in the target language.

Although described in terms of natural language translation, these considerations apply more generally to translation or conversion tasks in which source content structured in a source format is converted to a (different) target format, in which the content may deviate from precise adherence to the formats. For example, structured electronic documents are typically structured, e.g. in XML in accord with a document type definition (DTD). However, the document may occasionally deviate from the DTD. Such deviations may be variously handled, for example by applying default formatting during rendering.

The following sets forth improved methods and apparatuses.

BRIEF DESCRIPTION

In some illustrative embodiments disclosed as illustrative examples herein, a method comprises: receiving or generating bi-content including source content in a source language or format and corresponding target content in a target language or format, wherein the target language or format is different from the source language or format; generating a source weighted finite state automaton representing the source content of the bi-content; generating a target weighted finite state automaton representing the target content of the bi-content; and computing a bilateral intersection between (i) the source weighted finite state automaton, (ii) a synchronous weighted context-free grammar comprising synchronized grammars for the source language or format and the target language or format, and (iii) the target weighted finite state automaton to generate an enriched synchronous weighted context free grammar. In some embodiments, the generating of the source and target weighted finite state automata and the computing of the bilateral intersection are performed by a digital processor.

In some illustrative embodiments disclosed as illustrative examples herein, an apparatus comprises a digital processor configured to perform a method operating on bi-content including source content in a source language or format and corresponding target content in a target language or format different from the source language or format. The method includes: generating a source weighted finite state automaton representing the source content of the bi-content, generating a target weighted finite state automaton representing the target content of the bi-content, and generating an enriched synchronous weighted context-free grammar by computing a bilateral intersection between (i) the source weighted finite state automaton, (ii) a synchronous weighted context-free grammar comprising synchronized grammars for the source language or format and the target language or format, and (iii) the target weighted finite state automaton.

In some illustrative embodiments disclosed as illustrative examples herein, a storage medium stores instructions executable by a digital processor to perform a method operating on bi-content including source content in a source language or format and corresponding target content in a target language or format different from the source language or format. The method includes generating a source weighted finite state automaton representing the source content of the bi-content, generating a target weighted finite state automaton representing the target content of the bi-content, and enriching a synchronous weighted context-free grammar comprising synchronized grammars for the source language or format and the target language or format by computing a bilateral intersection between the source weighted finite state automaton, the synchronous weighted context-free grammar, and the target weighted finite state automaton.

DETAILED DESCRIPTION

Approaches are disclosed herein for retaining the substantial benefits of a hierarchical grammar-based translation or conversion approach, while additionally providing the substantial benefits of a phrase-based or other "bi-content" based translation or conversion approach. The disclosed approaches enrich the grammar with the phrase-based or other bi-content information by constructing an enriched synchronous grammar as a bilateral intersection between: (1) a weighted finite state automaton representing the source side of the bi-content (e.g., source language phrase or phrases of bilingual phrase content); (2) the synchronous grammar; and (3) a weighted finite state automaton representing the target side of the bi-content (e.g., target language phrase or phrases of bilingual phrase content). Because the enriched synchronous grammar is a bilateral intersection of these three constituent elements, it follows that performing hierarchical grammar-based translation or conversion using the enriched synchronous grammar automatically ensures compliance (at least in a probabilistic or statistical sense as defined by weights of the constituent elements) with each of the three constituent components of the enriched grammar.

Techniques are also disclosed herein by which the bilateral intersection is computed simultaneously. This promotes computational efficiency since the simultaneous bilateral intersection between the three constituent elements is typically smaller than the unilateral intersection between the grammar with the source automaton followed by the intersection of the resulting synchronous grammar with the target automaton. By using bottom-up techniques for the bilateral intersection computation as also disclosed, which start from the terminal elements and proceed "upward" in the hierarchy, efficiency is further enhanced since non-terminals which are non-productive (that is, do not produce any viable source-target pairs) can be identified and omitted.

In an illustrative example of natural language translation, it is disclosed that bi-content derived by inputting source language content into a phrase-based translation model can be represented as a weighted finite state automaton of a special kind, referred to herein as a sigma automaton or σ-automaton. The source language content (represented by a standard automaton), the synchronous grammar, and the σ-automaton can be combined using the bilateral intersection-based approach as disclosed herein in order to generate an enriched synchronous grammar that is enriched with the bi-content generated by the phrase-based translation model. The enriched synchronous grammar can then be applied to the source language content to generate a translation in the target language that is based on the (original) grammar enriched by the phrase-based model information. Advantageously, this integration of phrase-based and hierarchical translation is achieved without modifying the complex grammar-based hierarchical translation processing, except that the hierarchical translation processing uses the enriched synchronous grammar.

Figure 1:
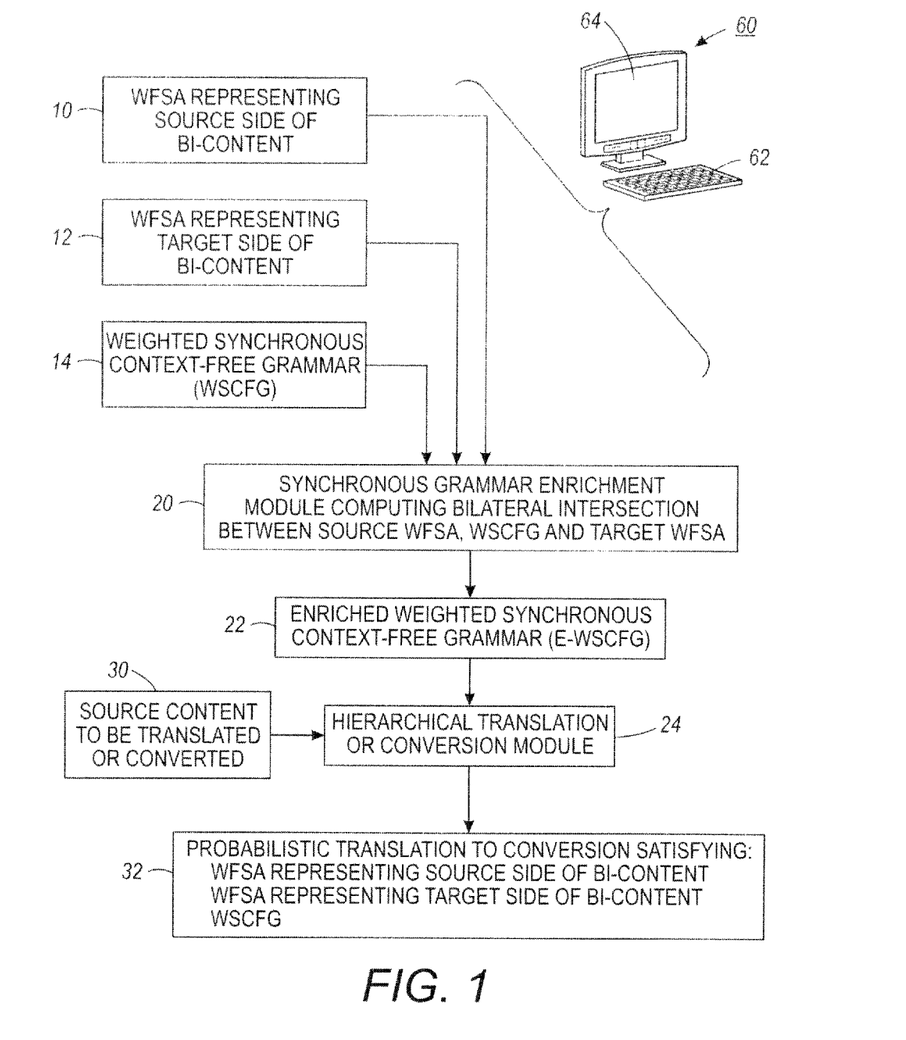
FIG. 1 diagrammatically shows an illustrative system for enriching a grammar based on bi-content having source and target content sides represented as a finite state automata.

With reference to FIG. 1, an illustrative system is described for enriching a grammar based on bi-content having source and target contents sides represented as finite state automata. The inputs to the system include: a weighted finite state automaton (WFSA) denoted as $A_s$ 10 representing the source side of the bi-content, for example one or more source language sentences, and a weighted finite state automaton (WFSA) denoted as $A_t$ 12 representing the target side of the bi-content, for example one or more target language sentences that may be translations of the source language sentences of the WFSA 10. Weights of the two automata $A_s$, $A_t$ 10, 12 delineate likelihoods or probabilities of the possible translations.

A third input to the system is a weighted synchronous context-free grammar (WSCFG) denoted as G 14. A context-free grammar (CFG) is also known as a phrase structure grammar, and comprises production or rewriting rules of the form V→w where V is a nonterminal element or symbol and w is a string or sequence (possibly empty) of terminal and/or nonterminal elements or symbols. The CFG G 14 is a synchronous grammar specifying correspondence between grammatical elements of source and target languages (or, more generally, between grammatical elements of source and target content). The synchronous CFG G 14 is a weighted grammar, meaning that each production or rewriting rule has an associated weight, and a given parsing has a probability that is computed based on the weights of the constituent rules.

A synchronous grammar enrichment module 20 computes the bilateral intersection between the inputs 10, 14, 12 to generate an enriched weighted synchronous context-free grammar (WSCFG) G' 22. This enriched synchronous grammar may be used wherever a synchronous grammar is useful. In illustrative FIG. 1, a hierarchical translation or conversion module 24 translates or converts source content 30 using a hierarchical grammar-based translation or conversion algorithm employing the enriched WSCFG G' 22 to generate a probabilistic translation or conversion 32 that simultaneously satisfies (in a probabilistic or statistical sense): the WFSA 10 representing the source side of the bi-content; the WFSA 12 representing the target side of the bi-content; and the WSCFG G 14.

The weighted automata 10, 12 may represent a single unit of source (or target) information, such as a single source (or target) language sentence. In this case, the weights of the arcs of the automaton are typically set to unity. Alternatively, one or both automata 10, 12 may represent a set of information units, such as a set of possible source (or target) sentences. In this case, the weights of the arcs of the automaton represent probabilities or likelihoods (not necessarily normalized) of the various translations generated by various paths through the automata. By way of another illustrative example, the source WFSA $A_s$ 10 representing the source side of the bi-content may represent a single input document in a source format that is to be converted to a target format, while the target WFSA $A_t$ 12 representing the target side of the bi-content may represent a plurality of possible output documents in the target format, with each possible output document being generated by a path through the target WFSA $A_t$ 12 and having a likelihood computed from the weights of the arcs traversed along the path.

Figure 2:
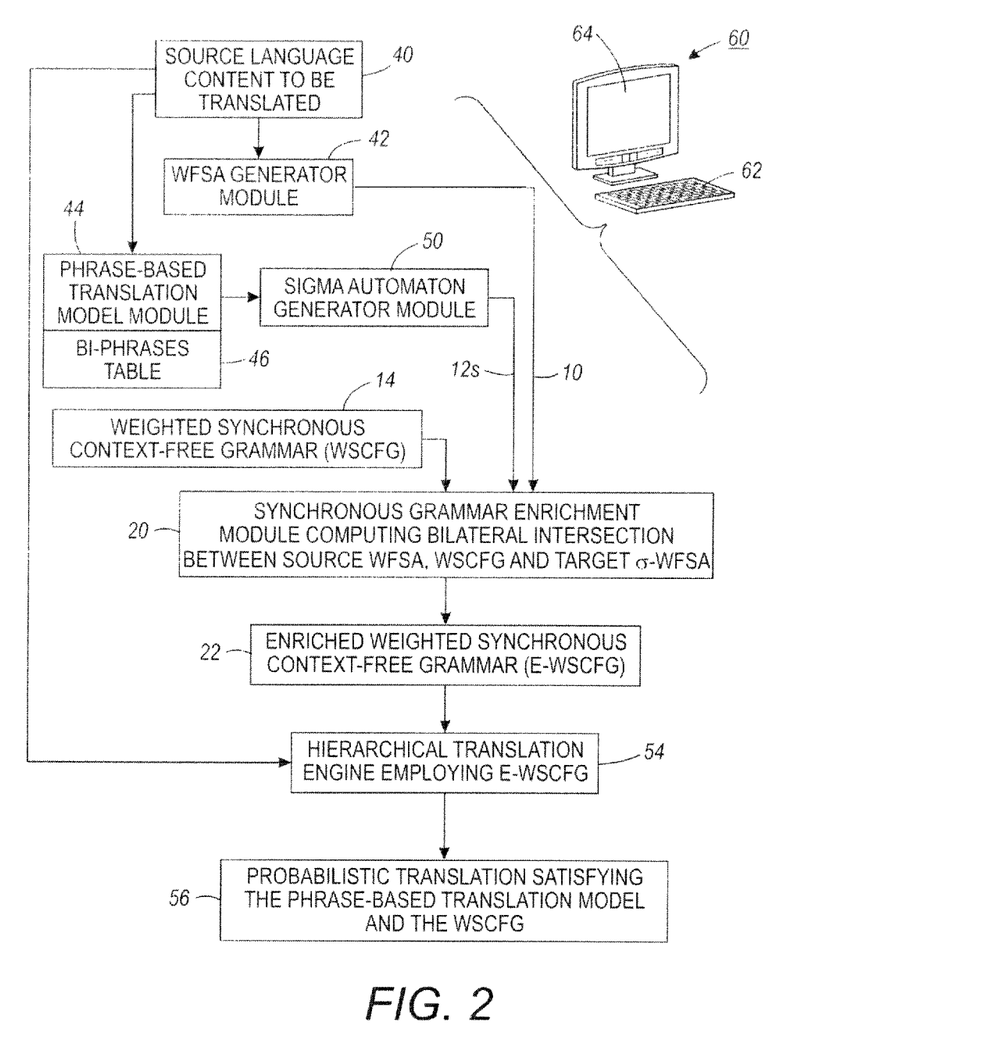
FIG. 2 diagrammatically shows an illustrative translation system employing the grammar enrichment system of FIG. 1.

With reference to FIG. 2, an illustrative system for enriching a grammar based on bi-content is described. The translation system receives source language content 40 to be translated. In this case the source WFSA $A_s$ 10 representing the source side of the bi-content is a WFSA representation of the source language content 40, suitably generated by a weighted finite state automaton generator module 42. For the translation application, the source WFSA $A_s$ 10 suitably represents a single source-language sentence to be translated. Since this automaton 10 has a single output (the content 40), the weights are not significant and can be suitably selected to be all equal to 1.

The target WFSA $A_t$ 12 of FIG. 1 is replaced in the translation system embodiment of FIG. 2 by a target sigma weighted finite state automaton (σ-WFSA $A_t$) 12s representing the target side of the bi-content is generated by a phrase-based translation model module 44, which compares portions of the source language content 40 with source language phrases stored in a bi-phrases table 46. When a match is found, the corresponding target language phrase is added to the target language content of the bi-content. A sigma automaton generator module 50 generates the sigma automaton based on the output of the phrase-based translation model module 44, and the sigma automaton serves as the target σ-WFSA $A_t$ 12s representing the target side of the bi-content. The synchronous grammar enrichment module 20 computes the bilateral intersection of: (i) the source WFSA $A_s$ 10 generated from the source language content 40 by the WFSA generator module 42; the WSCFG 14; and (iii) the target σ-WFSA $A_t$ 12s generated by the sigma automaton generator module 50 from the output of the phrase-based translation module 44.

The output of the synchronous grammar enrichment module 20 is the enriched weighted synchronous context-free grammar (E-WSCFG) 22. In the translation system embodiment of FIG. 2, the E-WSCFG 22 is enriched with the phrase-based translation bi-content provided by the phrase-based translation module 44 for the source language content 40. Accordingly, when the source language content 40 is input to a hierarchical translation engine 54 employing the E-WSCFG 22, the output is a probabilistic translation 56 that simultaneously satisfies: (i) the source language content 40; (ii) the WSCFG 14; and (iii) the phrase-based translation model employed by the module 44. The satisfaction of elements (ii) and (iii) is in a probabilistic or statistical sense, based on the weights of the weighted synchronous CFG 14 and the probabilities of the phrase-based translations indicated by the weights of the σ-automaton representing the output of the phrase-based translation model module 44.

The translation approach of FIG. 2 advantageously combines hierarchical and phrase-based translation approaches. While phrase-based systems allow a direct capture of correspondences between surface-level lexical patterns, but at the cost of a simplistic handling of re-ordering, hierarchical systems are better able to constrain re-ordering, especially for distant language pairs, but tend to produce sparser rules and often lag behind phrase-based systems for less distant language pairs. The system of FIG. 2 advantageously capitalizes on the complementary advantages of the two approaches. For the source language content 40 (e.g., a fixed source sentence x), an automaton is constructed by the sigma automaton generator module 50 that represents all the (weighted) target sentences that can be produced by applying the phrase-based model 44 to x. The resultant sigma-automaton (i.e., σ-automaton or σ-WFSA) 12s is non-standard in the sense that each transition is decorated with a set of source sentence tokens and that the only valid paths are those that do not traverse two sets containing the same token (in other words, valid paths cannot "consume" the same source token twice). Advantageously, intersecting a synchronous grammar simultaneously with the source sentence x and a (standard) target automaton results in another synchronous grammar. In the variant embodiment of FIG. 2, the σ-automaton 12s generated by the module 50 is suitably input to the grammar enrichment module 20 along with the weighted synchronous context-free grammar (WSCFG) 14 to generate the enriched weighted synchronous context-free grammar (E-WSCFG) 22 that embodies a combination of the grammar-based and phrase-based translation methodologies. The enrichment module 20 is modified to accommodate the σ-automaton 12s as disclosed herein.

The resulting enriched weighted synchronous grammar 22 represents the "parse forest" (or "hypergraph") of all weighted derivations (that is, of all translations) that can be built over source sentence x, but where the weights incorporate knowledge of the phrase-based component. The enriched grammar 22 can therefore form the basis of a variety of dynamic programming or sampling algorithms. Moreover, it is disclosed herein that, while in principle the intersected grammar could contain an exponential number of nonterminals resulting in combinatorial explosion, in practice such combinatorial explosion is not expected to occur. Also disclosed herein are formal conditions under which such combinatorial explosion is disallowed.

The illustrative grammar enrichment module 20 and the application module 24 (or translation engine 54) using the enriched synchronous grammar, as well as the phrase-based translation model module 44 and the automaton generator modules 42, 50, are suitably embodied by a digital processor or digital processing device, such as an illustrative computer 60, or another digital processor or digital processing device such as a personal data assistant (PDA) or "smartphone", a network server implementing a document archiving system, a dedicated handheld translation device, or so forth. The inputs, e.g. the source language content 40 or more generally the source and target weighted finite state automata 10, 12 (or 12s in the case of the embodiment of FIG. 2), are suitably generated by an application program such as a translation application running on the computer 60. In some embodiments, a human user selects the source language content 40 or other input 10, 12 to be processed using a keyboard 62, mouse (not shown), or other user input device. In other embodiments, the input to be processed is generated automatically by an application program. In some embodiments, a human user views the probabilistic translation 56 on a display device 64. For example, the translation having the highest probability may be displayed, or a top-N highest probability translations may be displayed for user selection of a "best" translation via the user input device 62, or so forth. More generally, the output 32 may be displayed, or a top-N most probable outputs may be displayed for user consideration or selection. In other embodiments, the output 32, 56 serves as input to an application program that uses the output 32, 56 in some automated further processing.

Additionally, it will be appreciated that the illustrative grammar enrichment module 20 and the application module 24 (or translation engine 54) using the enriched synchronous grammar, as well as the phrase-based translation model module 44 and the automaton generator modules 42, 50, are suitably embodied by a storage medium storing instructions executable by a digital processor or digital processing device to perform the functionality of the modules or engines 20, 24, 42, 44, 50, 54. The storage medium may, for example, be a hard disk drive or other magnetic storage medium, and/or an optical disc or other optical storage medium, and/or a random access memory (RAM), read-only memory (ROM), flash memory, or other electronic storage medium; various combinations thereof, or so forth.

With reference to FIG. 1, an illustrative system has been described for enriching a synchronous grammar based on bi-content having source and target content sides represented as finite state automata. With reference to FIG. 2, an illustrative translation system employing the grammar enrichment system of FIG. 1 has been described. In the following, additional aspects are disclosed, including adaptation of the grammar enrichment system 20 to accommodate bilateral intersection including the target sigma automaton 12s.

In the following, some illustrative examples of the bilateral intersection computation performed by the synchronous grammar enrichment module 20 are described, as well as some illustrative examples of the σ-automaton generation performed by the module 50 and use of the σ-automaton in embodiments of the bilateral intersection computation. In these illustrative examples, the following elements and notation are used. The weighted synchronous context-free grammar (WSCFG) 14 is denoted G, and comprises synchronized grammars $G_s$, $G_t$ for the source language or format (grammar $G_s$) and for the target language or format (grammar $G_t$). The source language grammar $G_s$ varies over a source vocabulary $V_s$, while the target language grammar $G_t$ varies over a target vocabulary $V_t$. In the illustrative examples, the grammars $G_s$, $G_t$ are grammars for source and target natural languages, respectively, and terminal elements correspond to words (or, more generally, elements). Nonterminal elements of the grammars $G_s$, $G_t$ correspond to grammatical elements such a phrases or sentences, and each grammar comprises grammar rules (sometimes called rewriting rules) that can be used to parse the natural language content.

Although natural language processing is the illustrative embodiment, more generally a grammar comprising rewriting rules can be used for parsing various other types of structures. For example, a document can be structured in accordance with a grammar having terminal elements corresponding to paragraphs or other document elements and nonterminal elements combinable in accordance with the grammar rules to define a properly structured document conforming with the grammar. A synchronous grammar having synchronized source and target grammars can then be used to convert a structured document in the source format into a corresponding document in the target format.

In the illustrative examples, bi-content includes source content in a source natural language and corresponding target (translation) content in a target natural language. These are illustrative examples: more generally, the bi-content includes source content in a source language or format and corresponding target content in a target language or format. The source content is represented by a source weighted finite state automaton (W-FSA or WFSA) 10 denoted $A_s$, which varies over the source $V_s$ vocabulary and has initial state $s_\#$ and final state $s_\$$. The target content is represented by a target WFSA 12 denoted $A_t$, which varies over the target vocabulary $V_t$ and has initial state $t_\#$ and final state $t_\$$.

The grammar G defines a weighted synchronous language $L_G$ over $(V_s, V_t)$. The automaton $A_s$ defines a weighted language $L_s$ over $V_s$, and the automaton $A_t$ defines a weighted language $L_t$ over $V_t$. The intersection language L' between these three languages $L_s, L_G, L_t$ is defined as the synchronous language denoted $L' = L_s \cap L_G \cap L_t$ over $(V_s, V_t)$ such that, for any pair (x,y) of a source and a target sentence, the weight $L'(x,y)$ is defined by $L'(x,y) \equiv L_s(x) \cdot L_G(x,y) \cdot L_t(y)$, where $L_s(x), L_G(x,y),$ and $L_t(y)$ are the weights associated to each of the component languages.

It is disclosed herein that there exists a synchronous grammar G' generating the language L'. In some embodiments the intersection $G' = A_s \cap G \cap A_t$ is computed simultaneously rather than as a sequence of intersecting $A_s$ with G, then the resulting grammar with $A_t$. In these embodiments the computing of the bilateral intersection $G' = A_s \cap G \cap A_t$ does not include computing a unilateral intersection between the source weighted finite state automaton $A_s$ and the synchronous weighted context free grammar G, and does not include computing a unilateral intersection between the synchronous weighted context free grammar G and the target weighted finite state automaton $A_t$. The intersection $G' = A_s \cap G \cap A_t$ processes weighted automata $A_s, A_t$ and the weighted context-free grammar G.

The construction of G' is described herein with reference to the following illustrative example. Consider a W-SCFG grammar G for translating between French and English, with initial nonterminal S, and containing among others the following rule:

$$N \rightarrow A \text{ manque à } B/B \text{ misses } A : \theta \quad (1),$$

where the source and target right-hand sides are separated by a slash symbol, and where θ is a non-negative real weight (interpreted multiplicatively) associated with the rule. In this context, consider the following "rule scheme":

$$_{s_0}^{t_0} N_{s_4}^{t_3} \rightarrow{} _{s_0}^{t_2} A_{s_1}^{t_3}{}_{s_1} \text{manque}_{s_2 s_2} \grave{a}_{s_3 s_3}{}^{t_0} B_{s_4}^{t_1}/_{s_3}^{t_0}$$
$$B_{s_4}^{t_1}{}_{t_1} \text{misses}^{t_2}{}_{s_0}^{t_2} A_{s_1}^{t_3} \quad (2),$$

This scheme consists in an "indexed" version of the original rule, where the bottom indices $s_i$ correspond to states of $A_s$ ("source states"), and the top indices $t_i$ correspond to states of $A_t$ ("target states"). The nonterminals are associated with two source and two target indices, and for the same nonterminal, these four indices match across the source and the target right-hand sides of the rule. As for the original terminals, they are replaced by "indexed terminals", where source (resp. target) terminals have two source (resp. target) indices. The source indices appear sequentially on the source right-hand side of the rule, in the pattern $s_0, s_1, s_1, s_2, s_2, \ldots, s_{m-1}, s_m$, with the nonterminal on the left-hand side receiving source indices $s_0$ and $s_m$, and similarly the target indices appear sequentially on the target right-hand side of the rule, in the pattern $t_0, t_1, t_1, t_2, t_2, \ldots, t_{n-1}, t_n$, with the nonterminal on the left-hand side receiving target indices $t_0$ and $t_n$. To clarify, the operation of associating indices to terminals and nonterminals can be decomposed into three steps:

$$_{s_0} N_{s_4} \rightarrow{} _{s_0} A_{s_1}{}_{s_1} \text{manque}_{s_2 s_2} \grave{a}_{s_3 s_3} B_{s_4}/B \text{ misses } A$$

$$^{t_0} N^{t_3} \rightarrow A \text{ manque à } B/^{t_0} B^{t_1}{}_{t_1} \text{misses}^{t_2}{}^{t_2} A^{t_3}$$

$$_{s_0}^{t_0} N_{s_4}^{t_3} \rightarrow{} _{s_0}^{t_2} A_{s_1}^{t_3}{}_{s_1} \text{manque}_{s_2 s_2} \grave{a}_{s_3 s_3}{}^{t_0} B_{s_4}^{t_1}/_{s_3}^{t_0}$$
$$B_{s_4}^{t_1}{}_{t_1} \text{misses}^{t_2}{}_{s_0}^{t_2} A_{s_1}^{t_3} \quad (2a),$$

where the first two steps corresponds to handling the source and target indices separately, and the third step then assembles the indices in order to get the same four indices on the two copies of each right-hand side nonterminal. The rule scheme of Equation (2) generates a family of rules, each of which corresponds to an arbitrary instantiation of the source and target indices to states of the source and target automata respectively. With every such rule instantiation, a weight θ' is associated which is defined as:

$$\theta' \equiv \tag{3}$$

$$\theta \cdot \prod_{s_i \text{ s-term} s_{i+1}} \theta_{A_s}(s_i, s - \text{term}, s_{i+1}) \cdot \prod_{t_j \text{ t-term} t_{j+1}} \theta_{A_t}(t_j, t - \text{term}, t_{j+1}),$$

where the first product is over the indexed source terminals $s_i$s-term$_{s_{i+1}}$, the second product over the indexed target terminals $t_j$t-term$^{t_{j+1}}$; $\theta_{A_s}(s_i, \text{s-term}, s_{i+1})$ is the weight of the transition $(s_i,\text{s-term},s_{i+1})$ according to $A_s$, and similarly for $\theta_{A_t}(t_j, \text{t-term}, t_{j+1})$. In these products, it may happen that $\theta_{A_s}(s_i, \text{s-term}, s_{i+1})$ is null (and similarly for $A_t$), and in such a case, the corresponding rule instantiation is considered not to be realized. Now consider the multiset of all the weighted rule instantiations for Equation (1) computed in this way, and for each rule in the collection, "forget" the indices associated to the terminals. In this way, a collection of weighted synchronous rules over the vocabularies $V_s$ and $V_t$ is obtained, but where each nonterminal is now indexed by four states. By applying this procedure to all the rules of the grammar G, a new weighted synchronous context-free grammar G' is obtained, with a start symbol $_{s_\#}{}^{t\#}S_{s_\$}{}^{t\$}$, for which $L_{G'}$ is equal to $L'=L_s \cap L_G \cap L_t$.

Thus, the grammar G' represents the bilateral intersection. However, most of its nonterminals are improductive, that is, can never produce a bi-sentence. If a rule refers to such an improductive nonterminal, it can be eliminated from the grammar. This is the analog for a synchronous context-free grammar (SCFG) of the operation of reduction for CFG's. Conceptually, one could start from G' and perform the reduction by deleting the many rules containing improductive nonterminals. However, it is equivalent and more efficient to do the reverse, namely to incrementally add the productive nonterminals and rules of G' starting from an initially empty set of rules, and by proceeding bottom-up starting from the terminals. Such bottom-up processing is analogous to chart-parsing, but here the construction is decomposed into first building a semantics-preserving grammar and then reducing it.

The variant embodiment of FIG. 2 is next addressed, including the adaptation of the enrichment module 20 to accommodate input of a sigma automaton. In some applications (for example, some illustrative translation applications which are described herein with reference to FIG. 2), it is useful for one of the automata of the intersection to be a sigma automaton (also represented herein as a σ-automaton). Let $V_s$ be a source vocabulary, and let $V_t$ be a target vocabulary. Let $x=x_1, \ldots, x_M$ be a fixed sequence of words over the source vocabulary $V_s$. Further denote by z a token in the sequence x, and denote by Z the set of the M tokens in x.

Figure 3:
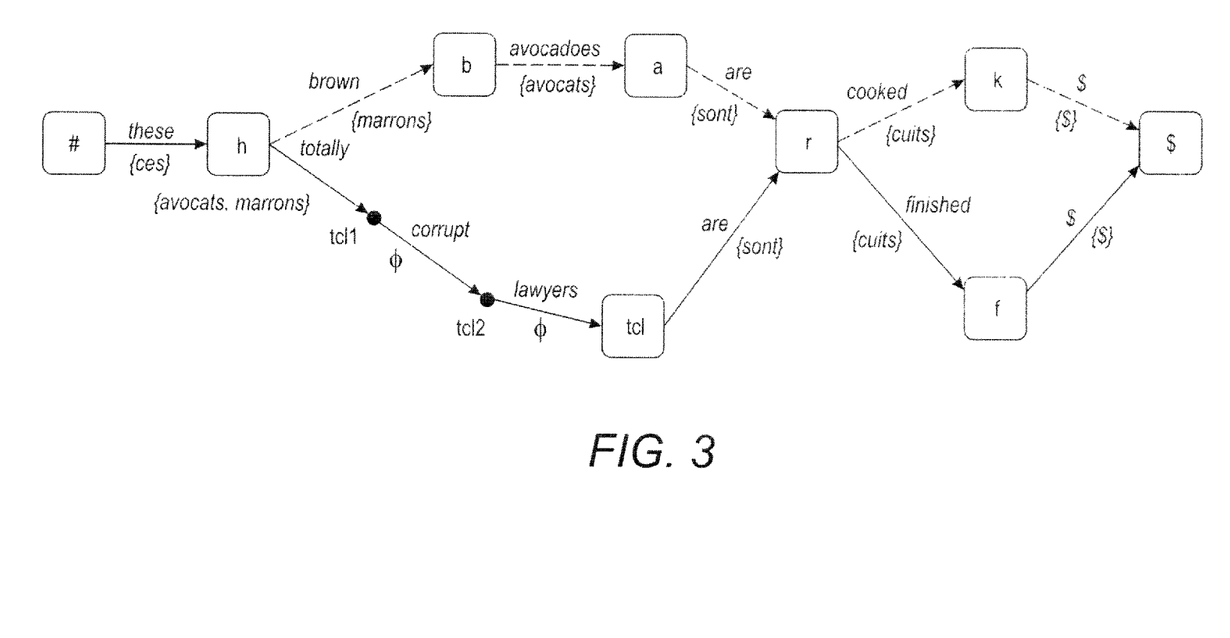
FIG. 3 diagrammatically shows a portion of an σ-automaton SA representing phrase based translation information for an illustrative example.

With reference to FIG. 3, a σ-automaton over x has the general form of a standard weighted automaton over the target vocabulary, but where the edges are also decorated with elements of P(Z), the powerset of Z. An edge in the σ-automaton between two states q and q' then carries a label of the form $(\alpha, \beta)$, where $\alpha \in P(Z)$ and $\beta \in V_t$. (Each edge also carries a non-negative real weight, which is not explicitly shown). Note that here β is not allowed to be the empty string ε. A path from the initial state of the automaton to its final state is defined to be valid if and only if each token of x appears in exactly one label of the path, but not necessarily in the same order as in x. The output associated with the path is the ordered sequence of target labels on that path, and the weight of the path is the product of the weights on its edges. FIG. 3 shows a representation of a σ-automaton, with two valid paths shown. Each box in FIG. 3 denotes a state corresponding to a phrase pair, while states internal to a phrase pair (such as tcl1 and tcl2) are not boxed. Above each transition is indicated the corresponding target word, and below each transition is indicated the corresponding set of source tokens. A terminal symbol $ to denote the end of sentence both on the source and on the target. The solid path corresponds to the output "these totally corrupt lawyers are finished". The dotted path corresponds to the output "these brown avocadoes are cooked". Note that the source tokens are not necessarily consumed in the order given by the source, and that, for example, there exists a valid path generating "these are totally corrupt lawyers finished" and moving according to h→r→tcl1→tcl2→tcl→f. Note, however, that this does not mean that if a biphrase such as (marrons avocats, avocado chestnuts) existed in the phrase table 46, it would be applicable to the source sentence here. Rather, because the source words in this biphrase would not match the order of the source tokens in the sentence, the biphrase would not be included in the σ-automaton.

Examples of the use of σ-automata in translation, for example as diagrammatically shown in FIG. 2, is next discussed in additional detail. In FIG. 2, the phrase-based translation system is represented by the phrase-based translation model module 44. In some illustrative approaches, the output of this phrase-based translation system is represented in terms of σ-automata by the σ-automaton generator module 50 as follows. To simplify exposition, it is assumed here that the language model used is a bigram model, but more generally any n-gram model can be accommodated. Then, given a source sentence x, decoding operates by attempting to construct a sequence of phrase-pairs of the form $(\tilde{x}_1, \tilde{y}_1), \ldots, (\tilde{x}_1, \tilde{y}_k)$ such that each $\tilde{x}_i$ corresponds to a contiguous subsequence of tokens of x, and the $\tilde{x}_i$ terms do not overlap and completely cover x (although the $\tilde{x}_i$ terms may appear in a different order than that of x). The output associated with the sequence is the concatenation of all the $\tilde{y}_i$ terms in that sequence. (Here it is assumed that the bi-phrase pairs $(\tilde{x}_i, \tilde{y}_i)$ are such that $\tilde{y}_i$ is not the empty string—this constraint could be removed by an adaptation of the ε-removal operation.) The weight associated with the sequence of phrase-pairs is then the product (assuming here working with probabilities rather than log-probabilities) of the weight of each $(\tilde{x}_{i+1}, \tilde{y}_{i+1})$ in the context of the previous $(\tilde{x}_i, \tilde{y}_i)$, which includes the product of several elements: (i) the "out-of-context" weight of the phrase-pair $(\tilde{x}_{i+1}, \tilde{y}_{i+1})$ as determined by its features in the phrase table 46, (ii) the language model probability of finding $\tilde{y}_{i+1}$ following $\tilde{y}_i$; and (iii) the contextual weight of $(\tilde{x}_{x+1}, \tilde{y}_{i+1})$ relative to $(\tilde{x}_i, \tilde{y}_i)$ corresponding to the distorsion cost of "jumping" from the token sequence $\tilde{x}_i$ to the token sequence $\tilde{x}_{i+1}$ when these two sequences may not be consecutive in x. Any distorsion model, and in particular a "lexicalized reordering" distorsion model, that only depends on comparing two consecutive phrase-pairs can be implemented in this way. Regarding item (ii), the bigram assumption is relevant. For a trigram model, it may be appropriate to encode in the automaton not only the immediately preceding phrase-pair, but also the previous one, and so on for higher-order models. An alternative is to keep the n-gram language model outside the a-automaton and intersect it later with the grammar G', optionally using approximation techniques such as cube-pruning.

Such a model can be represented by a σ-automaton, where each phrase pair $(\tilde{x}_i, \tilde{y}_i)$—for $\tilde{x}$ a sequence of tokens in x and an $(\tilde{x}_i, \tilde{y}_i)$ entry in the global phrase table 46—is identified with a state of the automaton and where the fact that the phrase pair $(\tilde{x}', \tilde{y}')=((x_1, \ldots, x_k), (y_1, \ldots, y_l))$ follows $(\tilde{x}, \tilde{y})$ in the decoding sequence is modeled by introducing l "internal" transitions with labels $(\sigma, y_1), (\emptyset, y_2), \ldots, (\emptyset, y_l)$, where σ={$x_1, \ldots, x_k$}, and where the first transition connects the state ($\tilde{x},\tilde{y}$) to some unique "internal state" $q_1$, the second transition the state $q_1$ to some unique internal state $q_2$, and the last transition $q_k$ to the state ($\tilde{x}',\tilde{y}'$). (For simplicity, it is chosen here to collect the set of all the source tokens {$x_1, \ldots, x_k$} on the first transition, but these source tokens could alternatively be distributed on the l transitions for the most part arbitrarily, but keeping the subsets disjoint. Thus, a state ($\tilde{x}',\tilde{y}'$) in effect encodes the previous phrase pair used during decoding, and it can be seen that it is possible to account for the different weights associated with the phrase-based model by weights associated to the transitions of the σ-automaton. By creating states such as (($\tilde{x},\tilde{y}$), ($\tilde{x}',\tilde{y}'$)) that encode the two previous phrase-pairs used during decoding, it is possible to account for a trigram language model, and similarly for higher-order LMs. This is similar to implementing n-gram language models by automata whose states encode the n−1 words previously generated.

To further illustrate by way of example, consider the following French-language source sentence:

x: ces avocats marrons sont cuits, which is an idiomatic expression for the English-language these totally corrupt lawyers are finished.

Assume for this example that phrase table 46 contains the following phrase pairs:

h (ces, these)

a: (avocats, avocados)

b:(marrons, brown)

tcl: (avocats marrons, totally corrupt lawyers)

r: (sont, are)

k: (cuits, cooked)

f: (cuits, finished)

An illustration of the corresponding σ-automaton SA is shown in FIG. 3, with only a few transitions made explicit, and with no weights shown. In FIG. 3, two illustrative (valid) paths are shown. If the full σ-automaton had been shown, then the graph would have been "complete" in the sense that for any two box states B, B', a connection B→$B_1'$→ ... → $B_{k-1}'$→B' would have been shown, where the $B_i'$ are internal states, and k is the length of the target side of the biphrase B'.

As further shown in FIG. 2, the σ-automaton representing the phrase-based translation information is combined with a grammar-based hierarchical translation model by employing the σ-automaton as the target automaton in the bilateral intersection computed by the synchronous grammar enrichment module 20. Some illustrative examples of this processing are as follows. If SA is a σ-automaton over input x, with each valid path in SA a weight is associated in the same way as in an ordinary weighted automaton. For any target word sequence in $V_t^*$, one can then associate the sum of the weights of all valid paths outputting that sequence. The weighted language $L_{SA,x}$ over $V_t$ obtained in this way is referred to herein as the language associated with SA. Let G be a weighted synchronous context-free grammar (W-SCFG) over $V_s, V_t$. Denote by $L_{G,x}$ the weighted language over $V_s, V_t$ corresponding to the intersection {x}∩G∩$V_t^*$, where {x} denotes the language giving weight 1 to x and weight 0 to other sequences in $V_s^*$, and $V_t^*$ denotes the language giving weight 1 to all sequences in $V_t^*$. Note that non-null bi-sentences in $L_{G,x}$ have their source projection equal to x and therefore $L_{G,x}$ can be identified with a weighted language over $V_t$. The intersection of the languages $L_{SA,x}$ and $L_{G,x}$ is denoted by $L_{SA,x} \cap L_{G,x}$.

The foregoing is further described by way of illustrative example. Consider the following W-SCFG (where again, weights are not explicitly shown, and where terminal symbol $ is used to denote the end of a sentence, which makes the grammar compatible with the SA automaton of FIG. 3):

S→NP VP $/NP VP $

NP→ces N A/these A N

VP→sont A/are A

A→marrons/brown

A→marrons/totally corrupt

A→cuits/cooked

A→cuits/finished

N→avocats/avocadoes

N→avocats/lawyers

It can be seen that, for instance, the following sentences:

these brown avacodoes are cooked $ these brown avacodoes are finished $ these totally corrupt lawyers are finished $ all belong to the intersection $L_{SA,x} \cap L_{G,x}$; whereas, the following sentences:

these avacodoes brown are cooked $ totally corrupt lawyers are finished these $ belong only to $L_{SA,x}$.

Figures 4, 5:
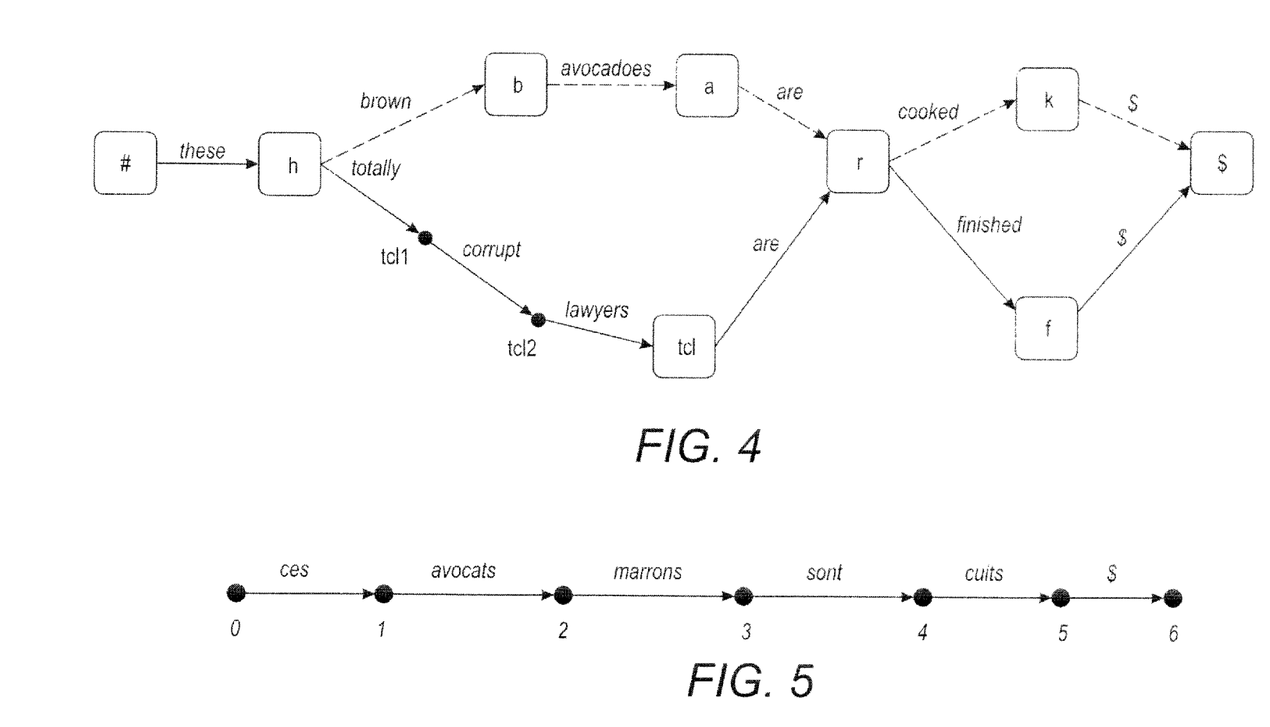
FIG. 4 diagrammatically shows a target weighted finite state automaton $A_t$ associated with the σ-automaton SA of FIG. 3, in which the source tokens are ignored but the same weights are kept.
FIG. 5 diagrammatically shows a "degenerate" automaton {x} representing a French-language sentence x discussed in the text, with weights on all transitions equal to 1.

With reference to FIG. 4, using the foregoing example some suitable approaches are described for building a W-SCFG that represents the intersection $L_{SA,x} \cap L_{G,x}$. FIG. 4 (compared with the σ-automaton of FIG. 3) shows how an automaton $A_t$ can be associated with the σ-automaton SA by "forgetting" the source-sides of the labels carried by the transitions but retaining all the same weights. As mentioned before with respect to FIG. 3, note that FIG. 4 also shows only a subset of the transitions.

All valid paths for the σ-automaton SA map into valid paths for the weighted finite state automaton (W-FSA) $A_t$ (with the same weights), but the reverse is not true because some valid paths of the W-FSA $A_t$ can correspond to traversals of SA that either consume the same source token several times or do not consume all source tokens. For instance, the sentence:

these brown avacodoes brown are $ belongs to the language of W-FSA $A_t$, but cannot be produced by the σ-automaton SA. However, consider the intersection {x}∩G∩$A_t$, where, with a slight abuse of notation, we have notated the "degenerate" automaton representing the sentence x, namely the automaton shown in FIG. 5 (with weights on all transitions equal to 1). This is a relaxation of the true intersection, but one that can be represented through a W-SCFG as disclosed herein. Note that, in the case of this example, any target string that belongs to this relaxed intersection, which consists of the eight sentences:

these {brown|totally corrupt} {avacodoes|lawyers} are {cooked|finished} $ actually belongs to the full intersection, as none of these sentences corresponds to a path in the σ-automaton SA that violates the token consumption constraint. More generally, it may often be the case in practice that the W-SCFG, by itself, provides enough "control" of the possible target sentences to prevent generation of sentences that would violate the token consumption constraints, so that there may be little difference in practice between performing the relaxed intersection {x}∩G∩$A_t$ and performing the full intersection {x}∩G∩$L_{SA,x}$.

This being noted, some illustrative approaches for the construction of the full intersection are set forth as follows. The previous description of modifying a synchronous grammar rule to produce an indexed rule scheme in order to represent the bilateral intersection of the grammar with two automata is redone here, in the case of the illustrative W-SCFG, of the target automaton represented in FIG. 4, and of the source automaton {x} of FIG. 5. The construction is done in three steps:

$$_{s_0}NP_{s_3} \to _{s_0}\text{ces}_{s_1}\ _{s_1}N_{s_2}\ _{s_2}A_{s_3}/\text{these } A\ N$$

$$^{t_0}NP^{t_3} \to \text{ces } N A/^{t_0}\text{these}^{t_1}\ ^{t_1}A^{t_2}\ ^{t_2}N^{t_3}$$

$$_{s_0}^{t_0}NP_{s_3}^{t_3} \to _{s_0}\text{ces}_{s_1}\ ^{t_1}_{s_1}N_{s_2}^{t_2}\ ^{t_2}_{s_2}A_{s_3}^{t_2}/^{t_0}_{\phantom{0}}\text{these}^{t_1}_{s_2}\ \ ^{t_1}A_{s_3}^{t_2}\ _{s_1}^{t_2}N_{s_2}^{t_3} \quad (4).$$

In order to adapt that construction to the case where the intersection is to be with a σ-automaton, the nonterminals are further specialized. Rather than specializing a nonterminal X in the form $_s{}^tX_{s'}{}^{t'}$, it is instead specialized in the form: $_s{}^tX_{s'}{}^{t',\sigma}$ where σ represents a set of source tokens that correspond to "collecting" the source tokens in the σ-automaton along a path connecting the states t and t'. (Note that σ is not necessarily related to the tokens appearing between the positions s and s' in the source sentence, that is, between these states in the associated source automaton, but is defined solely in terms of the source tokens along the t, t' path. A new rule scheme associated with the rule is then defined, which is obtained as before in three steps, as follows:

$$_{s_0}NP_{s_3} \to _{s_0}\text{ces}_{s_1}\ _{s_1}N_{s_2}\ _{s_2}A_{s_3}/\text{these } A\ N$$

$$^{t_0}NP^{t_3,\sigma_{03}} \to \text{ces } N A/^{t_0}\text{these}^{t_1,\sigma_{01}}\ ^{t_1}A^{t_2,\sigma_{12}}\ ^{t_2}N^{t_3,\sigma_{23}}$$

$$_{s_0}^{t_0}NP_{s_3}^{t_3,\sigma_{03}} \to _{s_0}\text{ces}_{s_1}\ ^{t_1}_{s_1}N_{s_2}^{t_2,\sigma_{23}}\ ^{t_2}_{s_2}A_{s_3}^{t_2,\sigma_{12}}/^{t_0}\text{t}\text{hese}^{t_1,\sigma_{01}}\ ^{t_1}_{s_2}A_{s_3}^{t_2,\sigma_{12}}\ ^{t_2}_{s_1}N_{s_2}^{t_3,\sigma_{23}} \quad (5).$$

The difference with the previous derivation is the addition of the σ terms to the top indices. To explain further, consider the second (i.e., middle) step of Equation (5). Conceptually, when instantiating this scheme, the $t_i$ terms may range over all possible states of the σ-automaton, and the $\sigma_{ij}$ over all subsets of the source tokens, but under the following constraints: the right-hand side σ terms (here $\sigma_{01}$, $\sigma_{12}$, $\sigma_{23}$) must be disjoint and their union must be equal to the σ terms on the left-hand side (here $\sigma_{03}$). Additionally, a σ term associated with a target terminal (as in the case of $\sigma_{01}$ the example of the middle step of Equation (5)) must be equal to the token set associated to the transition that this terminal realizes between σ-automaton states (here, this means that $\sigma_{01}$ must be equal to the token set {ces} associated with the transition between $t_0$, $t_1$ labeled with "these"). If these instantiations are performed and their weights are computed according to Equation (3), and finally the indices associated with terminals in the rules are removed (by adding the weights of the rules only differing by the indices of terminals), then a "raw" grammar is obtained. Denote this raw grammar G', its start symbol being $_{s_\#}^{t_\#}S_{s_\$}^{t_\$,\sigma_{all}}$, with $\sigma_{all}$ being the set of all source tokens in x. Then it follows that the synchronous language $L_{G'}$ associated with the raw grammar G' is equal to ({x}, $L_{SA,x} \cap L_{G,x}$).

Figure 6:
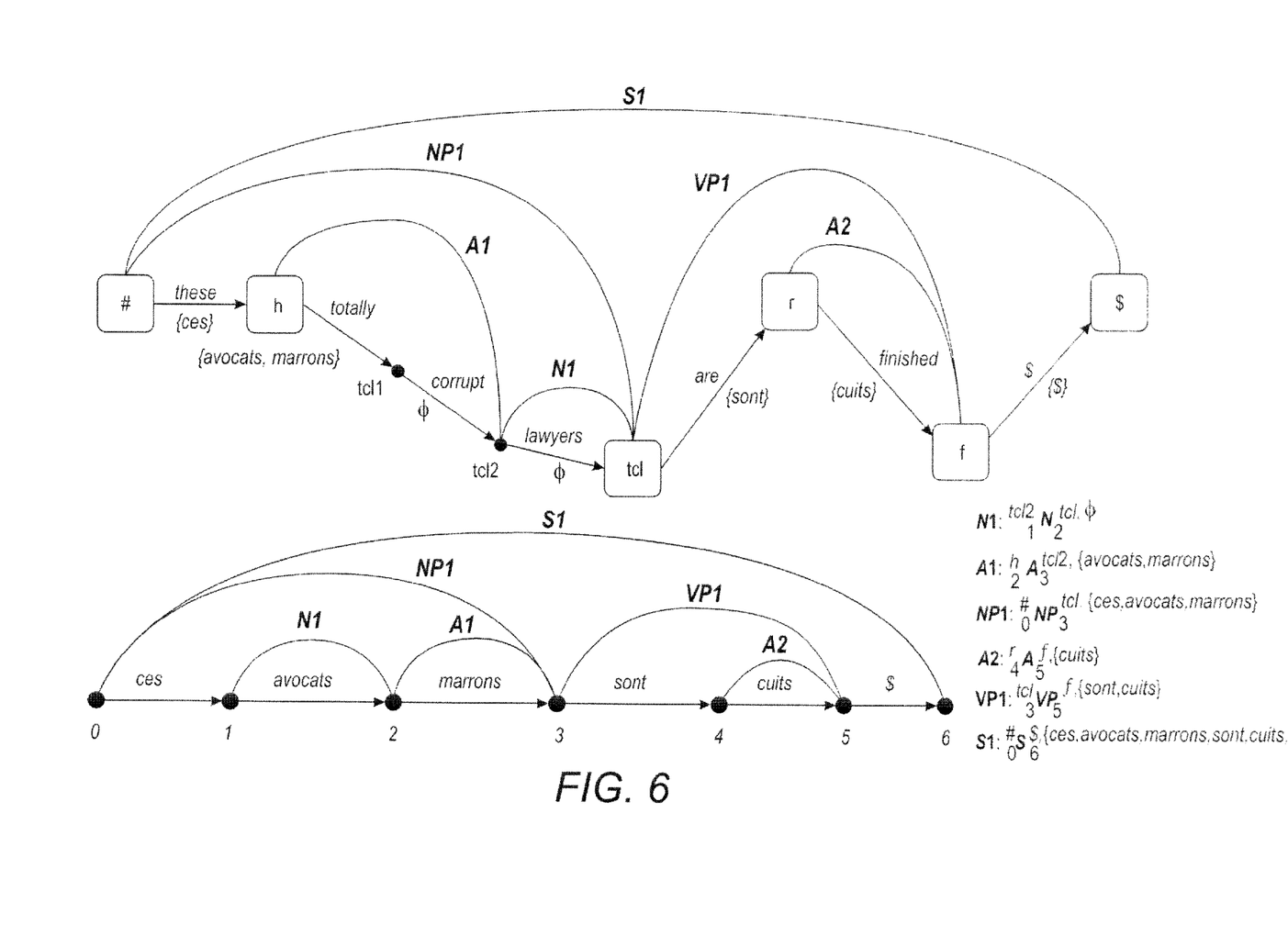
FIG. 6 diagrammatically shows a "bottom-up" approach for activating the nonterminals.

With reference to FIG. 6, the grammar that is obtained in this way, despite correctly representing the intersection, may contain a large number of useless rules, due to the fact that many nonterminals cannot produce any output. The situation can be alleviated by using bottom-up techniques for activating nonterminals and rules. FIG. 6 diagrammatically shows the bottom-up process of activating in turn the nonterminals, which are abbreviated in FIG. 6 by N1, A1, A2, NP1, VP1, S1. The bottom of FIG. 6 shows some active non-terminals associated with the source sequence, at the top these same non-terminals associated with a sequence of transitions in the σ-automaton, corresponding to the target sequence:

these totally corrupt lawyers are finished $

For visual clarity, the abbreviations shown on the right of FIG. 6 are used. Note that while A1 only spans marrons in the bottom chart, it is actually decorated with the source token set {avocats,marrons}. Such a "disconnect" between the views that the W-SCFG and the σ-automaton have of the source tokens is not ruled out. As a consequence of these bottom-up activations, the original grammar rule NP→ces N A/these A N (for instance) becomes instantiated as the rule:

$$_0^{\#}NP_3^{tcl,\{ces,avocats,marrons\}} \to _0\text{ces}_1\ _1^{tcl2}N_2^{tcl,\varnothing}\ _2^h A_3^{tcl2,} \\ \{avocats,marrons\}/^{\#}\text{these}^{h,\{ces\}}\ _2^h \\ A_3^{tcl2,\{avocats,marrons\}}\ _1^{tcl2}N_2^{tcl,\varnothing} \quad (6),$$

that is, after removal of the indices on terminals:

$$_0^{\#}NP_3^{tcl,\{ces,avocats,marrons\}} \to \text{ces}\ _1^{tcl2}N_2^{tcl,\varnothing}\ _2^h \\ A_3^{tcl2,\{avocats,marrons\}}/\text{these}\ _2^h \\ A_3^{tcl2,\{avocats,marrons\}}\ _1^{tcl2}N_2^{tcl,\varnothing} \quad (7).$$

Note that while the nonterminal $_1^{tcl2}N_2^{tcl,\varnothing}$ by itself consumes no source token (it is associated with the empty token set), any actual use of this nonterminal (in this specific rule or possibly in some other rule using it) does entail traversing the internal node tcl2 and therefore all the internal nodes "belonging" to the biphrase tcl (because otherwise the path from # to $ would be disconnected); in particular this involves consuming all the tokens on the source side of tcl, including "avocats". In particular there is no risk that a derivation relative to the intersected grammar generates a target containing two instances of "lawyers", one associated to the expansion of $_1^{tcl2}N_2^{tcl,\varnothing}$ and consuming no source token, and another one associated with a different nonterminal and consuming the source token "avocats". This is because this second instance would involve not traversing tell, which is impossible as soon as $_1^{tcl2}N_2^{tcl,\varnothing}$ is used.

In the case in which the bilateral intersection operates on standard automata (not on a sigma automaton as per the variant of illustrative FIG. 2), the bilateral intersection between the weighted synchronous context-free grammar (W-SCFG) and the two weighted finite state automata (W-FSA) can be shown to be of polynomial complexity in the sense that it takes polynomial time and space relative to the sum of the sizes of the two automata and of the grammar to construct the (reduced) intersected grammar G', under the condition that the grammar right-hand sides have length bounded by a constant. If this condition is removed, and for the simpler case where the source (resp. target) automaton encodes a single sentence x (resp. y), in can be shown that the problem of deciding whether (x,y) is recognized by G is NP-hard relative to the sum of the sizes. A consequence is then that the grammar G' cannot be constructed in polynomial time unless P=NP.

In embodiments in which one of the automata is a sigma automaton, such as in the translation application of FIG. 2, however, the construction of the intersection can in principle introduce nonterminals indexed not only by states of the automata, but also by arbitrary subsets of source tokens, and this may lead in extreme cases to an exponential number of rules. In such cases, the complexity can be substantially worse than polynomial complexity. Such problems however can only happen in situations where, in a nonterminal $_s{}^tX_{s'}{}^{t',\sigma}$, the set σ is allowed to contain tokens that are "unrelated" to the token set appearing between s and s' in the source automaton.

An illustration of such a situation is given by the following example. Suppose that the source sentence contains the two tokens personnes and gens between positions i,i+1 and j, j+1 respectively, with i and j far from each other, that the phrase table contains the two phrase pairs (personnes,persons) and (gens, people), but that the synchronous grammar only contains the two rules X→personnes/people and Y→gens/persons, with these phrases and rules exhausting the possibilities for translating gens and personnes. Then the intersected grammar will contain such nonterminals as $_i'X_{i+1}^{t',\{gens\}}$ and $_j'Y_{j+1}^{r',\{personnes\}}$, where in the first case the token set {gens} in the first nonterminal is unrelated to the tokens appearing between i, i+1, and similarly in the second case.

It is expected that in some cases, and perhaps most or all cases, such a phenomena would be prevented from leading to combinatorial explosion because the synchronous grammar would sufficiently constrain the phrase-base component (whose re-ordering capabilities are responsible in fine for the potential NP-hardness of the translation process) to avoid the combinatorial explosion. However, if the possibility of combinatorial explosion is a concern, one approach it is to prevent a priori a possible combinatorial explosion by adding formal constraints to the intersection mechanism. One such constraint is the following: disallow introduction of $_i'X_j^{t',\sigma}$ when the symmetric difference between σ and the set of tokens between positions i and j in the source sentence has cardinality larger than a small constant. Such a constraint can be understood as keeping the synchronous context-free grammar and phrase base components "in sync".

The disclosed approaches of intersecting hierarchical and phrase-based models of translation capitalize on complementarities between the two approaches. By way of illustrative example, one might train the hierarchical component on corpora represented at the part-of-speech level (or at a level where lexical units are abstracted into some kind of classes) while the phrase-based component might be focused on translation of lexical material.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    receiving or generating bi-content including source content in a source language or format and corresponding target content in a target language or format, wherein the target language or format is different from the source language or format;
    generating a source weighted finite state automaton representing the source content of the bi-content;
    generating a target weighted finite state automaton representing the target content of the bi-content; and
    computing a bilateral intersection between (i) the source weighted finite state automaton, (ii) a synchronous weighted context-free grammar comprising synchronized grammars for the source language or format and the target language or format, and (iii) the target weighted finite state automaton to generate an enriched synchronous weighted context-free grammar;
    wherein the generating of the source and target weighted finite state automata and the computing of the bilateral intersection are performed by a digital processor.

2. The method as set forth in claim 1, wherein:
    the bi-content includes source natural language content in a first natural language and corresponding target natural language content in a second natural language different from the first natural language, and
    the synchronous weighted context-free grammar comprises synchronized grammars for the source natural language and the target natural language.

3. The method as set forth in claim 2, wherein:
    the target natural language content comprises a plurality of candidate target natural language translations of the source natural language content, and
    the target weighted finite state automaton represents a plurality of candidate target natural language translations as paths of the weighted finite state automaton having path weights indicative of the target natural language translation likelihoods.

4. The method as set forth in claim 3, wherein the receiving or generating of the bi-content comprises:
    generating the target natural language content by applying a phrase-based translation model to the source natural language content wherein the phrase-based translation model references a database of bi-phrases each comprising a phrase in the source natural language and its translation in the target natural language.

5. The method as set forth in claim 4, wherein the target weighted finite state automaton comprises a σ-automaton having edges decorated with:
    tokens of the target natural language content generated by applying the phrase-based translation model to the source natural language content, and
    tokens of a powerset of tokens of the source language content.

6. The method as set forth in claim 4, further comprising:
    performing a hierarchical translation of the source language content using the enriched synchronous weighted context-free grammar;
    wherein the performing of the hierarchical translation is also performed by the digital processor.

7. The method as set forth in claim 3, wherein the target weighted finite state automaton comprises a σ-automaton having edges decorated with:
    tokens of the target natural language content, and
    tokens of a powerset of tokens of the source language content.

8. The method as set forth in claim 3, wherein the computing comprises:
    omitting from the bilateral intersection any term associating first and second tokens of the source natural language content with first and second tokens in the target weighted finite state automaton for which a symmetric difference between the target weighted finite state automaton and the set of tokens between the first and second tokens in the source natural language content has cardinality larger than a selected threshold value.

9. The method as set forth in claim 3, further comprising:
    performing a hierarchical translation of the source language content using the enriched synchronous weighted context-free grammar to generate at least one proposed translation for the source language content; and
    displaying the at least one proposed translation for the source language content.

10. The method as set forth in claim 1, wherein:
    the computing does not include computing a unilateral intersection between the source weighted finite state automaton and the synchronous weighted context-free grammar, and
    the computing does not include computing a unilateral intersection between the synchronous weighted context-free grammar and the target weighted finite state automaton.

11. The method as set forth in claim 1, wherein the computing comprises computing the bilateral intersection using a bottom-up process comprising:

initializing the bilateral intersection as an empty set of grammar rules; and adding grammar rules to the bilateral intersection that satisfy the source weighted finite state automaton, the synchronous weighted context-free grammar, and the target weighted finite state automaton, and that further are productive grammar rules capable of producing bi-content including terminal elements in both the source language or format and the target language or format.

12. An apparatus comprising:

a digital processor configured to perform a method operating on bi-content including source content in a source language or format and corresponding target content in a target language or format different from the source language or format, the method including:

generating a source weighted finite state automaton representing the source content of the bi-content, generating a target weighted finite state automaton representing the target content of the bi-content, and generating an enriched synchronous weighted context-free grammar by computing a bilateral intersection between (i) the source weighted finite state automaton, (ii) a synchronous weighted context-free grammar comprising synchronized grammars for the source language or format and the target language or format, and (iii) the target weighted finite state automaton.

13. The apparatus as set forth in claim 12, wherein the bi-content includes source natural language content in a first natural language and corresponding target natural language content in a second natural language different from the first natural language, the synchronous weighted context-free grammar comprises synchronized grammars for the source natural language and the target natural language, and the method performed by the digital processor further comprises:

generating the target natural language content by applying a phrase-based translation model to the source natural language content wherein the phrase-based translation model references a database of bi-phrases each comprising a phrase in the source natural language and its translation in the target natural language;

wherein the generating of the target weighted finite state automaton includes representing the plurality of target natural language translations as paths of the target weighted finite state automaton having path weights indicative of the target natural language translation likelihoods.

14. The apparatus as set forth in claim 13, wherein the generating of the target weighted finite state automaton comprises:

generating the target weighted finite state automaton as a σ-automaton having edges decorated with:

tokens of the target natural language content generated by applying the phrase-based translation model to the source natural language content, and tokens of a powerset of tokens of the source language content.

15. The apparatus as set forth in claim 13, wherein the apparatus comprises a natural language translation apparatus and the method performed by the digital processor further comprises:

performing a hierarchical translation of the source language content using the enriched synchronous weighted context-free grammar.

16. The apparatus as set forth in claim 13, wherein the computing of the bilateral intersection comprises:

omitting from the bilateral intersection any term associating first and second tokens of the source natural language content with first and second tokens in the target weighted finite state automaton for which a symmetric difference between the target weighted finite state automaton and the set of tokens between the first and second tokens in the source natural language content has cardinality larger than a selected threshold value.

17. The apparatus as set forth in claim 12, wherein:

the computing of the bilateral intersection does not include computing a unilateral intersection between the source weighted finite state automaton and the synchronous weighted context-free grammar, and the computing of the bilateral intersection does not include computing a unilateral intersection between the synchronous weighted context-free grammar and the target weighted finite state automaton.

18. A non-transitory storage medium storing instructions executable by a digital processor to perform a method operating on bi-content including source content in a source language or format and corresponding target content in a target language or format different from the source language or format, the method including generating a source weighted finite state automaton representing the source content of the bi-content, generating a target weighted finite state automaton representing the target content of the bi-content, and enriching a synchronous weighted context-free grammar comprising synchronized grammars for the source language or format and the target language or format by computing a bilateral intersection between the source weighted finite state automaton, the synchronous weighted context-free grammar, and the target weighted finite state automaton.

19. The non-transitory storage medium as set forth in claim 18, wherein the instructions are executable by a digital processor to perform a method operating on bi-content including source content in a source natural language and corresponding target content in a target natural language different from the source natural language, the method including generating a source weighted finite state automaton representing the source content of the bi-content, generating a target weighted finite state automaton representing the target content of the bi-content, and enriching a synchronous weighted context-free grammar comprising synchronized grammars for the source natural language and the target natural language by computing a bilateral intersection between the source weighted finite state automaton, the synchronous weighted context-free grammar, and the target weighted finite state automaton.

20. The non-transitory storage medium as set forth in claim 19, wherein the instructions are further executable by the digital processor to generate the target natural language content by applying a phrase-based translation model to the source natural language content wherein the phrase-based translation model references a database of bi-phrases each comprising a phrase in the source natural language and its translation in the target natural language.

21. The non-transitory storage medium as set forth in claim 20, wherein the instructions are executable by the digital processor to generate the target weighted finite state automaton comprising a σ-automaton having edges decorated with both tokens of the target natural language content generated by applying the phrase-based translation model to the source natural language content and tokens of a powerset of tokens of the source language content.

* * * * *